US011055815B2

(12) United States Patent
Kim et al.

(10) Patent No.: US 11,055,815 B2
(45) Date of Patent: Jul. 6, 2021

(54) APPARATUS FOR CORRECTING MULTI-VIDEO VIEWPOINT

(71) Applicant: Fdn. for Res.&Bus., Seoul Nat. Univ. of Sci.&Tech., Seoul (KR)

(72) Inventors: Dong Ho Kim, Seoul (KR); Bong-Seok Seo, Gyeonggi-do (KR)

(73) Assignee: Fdn. For Res.&Bus., Seoul Nat. Univ. Of Sci.&Tech., Seoul (KR)

( * ) Notice: Subject to any disclaimer, the term of this patent is extended or adjusted under 35 U.S.C. 154(b) by 0 days.

(21) Appl. No.: 16/705,876

(22) Filed: Dec. 6, 2019

(65) Prior Publication Data

US 2021/0158477 A1 May 27, 2021

(30) Foreign Application Priority Data

Nov. 26, 2019 (KR) .......................... 10-2019-0152853

(51) Int. Cl.
*G06T 3/20* (2006.01)
*G06T 7/00* (2017.01)
*G06F 3/01* (2006.01)
*G06T 7/70* (2017.01)

(52) U.S. Cl.
CPC ................ *G06T 3/20* (2013.01); *G06F 3/011* (2013.01); *G06T 7/70* (2017.01); *G06T 7/97* (2017.01)

(58) Field of Classification Search
None
See application file for complete search history.

(56) References Cited

U.S. PATENT DOCUMENTS

| 9,122,948 | B1* | 9/2015 | Zhu | .......................... G06T 7/231 |
| 2015/0062163 | A1* | 3/2015 | Lee | ....................... G06T 19/006 345/633 |
| 2016/0182593 | A1* | 6/2016 | Denoual | .......... H04N 21/23439 709/219 |
| 2017/0150130 | A1* | 5/2017 | Kimura | ................ H04N 13/271 |
| 2018/0061118 | A1* | 3/2018 | Choi | .................... H04N 13/275 |
| 2018/0307398 | A1* | 10/2018 | Kim | ..................... H04N 21/439 |
| 2018/0330171 | A1* | 11/2018 | Corcoran | ................. G06K 9/46 |

FOREIGN PATENT DOCUMENTS

| JP | 2019-47249 | 3/2019 |
| KR | 10-2019-0016264 | 2/2019 |
| KR | 10-2019-0018923 | 2/2019 |

* cited by examiner

*Primary Examiner* — Jwalant Amin
(74) *Attorney, Agent, or Firm* — HoustonHogle LLP (57) ABSTRACT

According to a specific embodiment of the present invention, an object at each viewpoint is recognized through image recognition, each recognized object is labeled, directional values and label values of objects that are determined as being the same are then input into an MPD, the MPD is transported, a direction of an object at a viewpoint to be moved, within an image, is corrected with a derived offset directional value, reproduction is performed, and thus, only with the labeling and the directional value of the object, the same content can be displayed on a screen without the user switching between directions. Accordingly, a reduction in an amount of data to be processed can improve a processing speed, and in turn, a sense of reality can be improved. Additionally, compatibility with an existing DASH structure is ensured, and applicability to existing image transport systems is widely expandable.

8 Claims, 5 Drawing Sheets

```
SAMPLE OF MPD STRUCTURE
<Period>
 <AdaptationSet>
  <SupplementalProperty SchemeIdUri=
"urn:mpeg:dash:6dof:2019"
 ,"Object="man#1" direction="60">--,--,--,"
  <Role schemeIdUri="urn:mpeg:dash:role:2011" value="main"
  <Representation id="1" width="3840" height="2160" ...>
   <BaseURL>A.mp4
   </BaseURL>
```

APPARATUS FOR CORRECTING MULTI-VIDEO VIEWPOINT

CROSS REFERENCE TO RELATED APPLICATION

The present application claims priority to Korean Patent Application No. 10-2019-0152853, filed Nov. 26, 2019, the entire contents of which is incorporated herein for all purposes by this reference.

BACKGROUND OF THE INVENTION

Field of the Invention

The present invention relates to a multi-image viewpoint correction apparatus in an image transport system. More particularly, the present invention relates to a technology in which an object at each viewpoint is recognized, the object is labeled with an identification number, directional values and identification numbers of objects that are determined as being the same are input into a media presentation description (MPD), the MPD is transported, a direction of the object in accordance with a change in the viewpoint is corrected on the basis of the received MPD of the object, and thus a multi-image viewpoint correction is performed.

Description of the Related Art

Recently, there have been increasing interest in and an increasing demand for 360-degree and virtual reality (VR) content, and accordingly, emphasis is placed on an interaction between the content and a user and on user's initiative in the interaction. In order to meet this demand, content-related technologies that have a 3 DoF degree of freedom or higher have been under development and discussion in picture standard bodies, such as MPEG and JPEG.

Accordingly, technologies, such as 3 DoF and 6 DoF, began to be standardized as picture standards. Recently, with great interest, research has been actively conducted on a multi-viewpoint image.

However, MPEG DASH that is an image streaming standard lacks standardization for a multi-viewpoint and support for an image transport method.

In addition, recently, technologies that simply transport various viewpoints in a bundle have been in a commercialized phase prior to a widespread use of a multi-viewpoint image.

However, in these technologies, because images point in the same direction, an image area of interest has to be always positioned in the center.

That is, in a case where a multi-viewpoint 360-degree image is displayed, a position of an image in which a user is interested may change according to a viewpoint. In this situation, when the user changes his/her viewpoint, from the user perspective, there is a need to correct an angle of an image in such a manner that content in which the user is interested is positioned in the same direction.

However, when a viewpoint is corrected in an image, a distance to an area of interest in the image can be precisely determined. Because of this, before precisely establishing a concept of a distance in the image through DepthMap, it is impossible to actually perform image viewpoint correction on the basis of a position in content.

In order to solve this problem, a technology for setting a direction of an image area in which the user is interested, is provided.

SUMMARY OF THE INVENTION

An objective of an embodiment of the present invention is to provide a multi-image viewpoint correction apparatus in an image transport system. The multi-image viewpoint correction apparatus is capable of recognizing an object at each viewpoint through image recognition, then labeling each recognized object, inputting directional values and label values of objects that are determined as being the same, into an MPD, and transporting the MPD, and of maintaining content without any change when changing a viewpoint in an area in which a user is interested, by utilizing the directional value in the received MPD of the object, then changing the viewpoint, and reproducing the content. As a result, the multi-image viewpoint correction apparatus can provide an advantage of increasing user convenience and a sense of reality.

According to an aspect of the present invention, there is provided a multi-view viewpoint correction apparatus in an image transport system, the apparatus including: an object recognition and labeling unit that extracts an object from images acquired through many cameras and labels the extracted object with an identification number; an object comparison unit that derives objects which have the same identification numbers according to a change in a viewpoint; and an MPD generation unit that inputs directional values and label values of the same objects in accordance with the change in the viewpoint into a media presentation description (MPD) of the object and transports the MPD.

In the apparatus, the object recognition and labeling unit may be provided in such a manner as to ignore an object below a reference size in an entire image in content that results from image-capturing and to label an object that has a ratio of the object to the entire image which is equal to or higher than a predetermined fixed ratio, with an identification number.

In the apparatus, the reference size may be set to $\frac{1}{10}$ of an image area that is viewed, which is derived on the basis of a current viewing angle at which viewing is possible, of an HMD.

In the apparatus, the object comparison unit may be provided in such a manner that, in a case where information on a positional relationship between images at viewpoints is recorded in the MPD of the image, on the basis of the information on the positional relationship, it is determined whether or not an object derived in the object recognition and labeling unit and an object of which a position is changed are the same.

In the apparatus, the object comparison unit may be provided in such a manner that, in a case where the information on the positional relationship between the images at viewpoints is not recorded in the MPD, feature matching and size matching are performed between the object derived in the object recognition and labeling unit and the object of which the position is changed and in such a manner that it is then determined through similarity derived on the basis of SSIM whether or not the object derived in the object recognition and labeling unit and the object of which the position is changed within the image are the same.

In the apparatus, the MPD generation unit may input a directional value and a label value for the identification number of the object derived in the object recognition and labeling unit, and a directional value and a label value for the identification number of the object of which the position is changed within the image, into a low-level portion of the MPD and may transport the MPD, the two objects being determined by the object comparison unit as being the same.

In the apparatus, the directional value of the object may be a position in the horizontal direction, which is positioned within the image, and may be derived as a value of an angle with respect to a user reference Yaw axis.

In the apparatus, the multi-image viewpoint correction apparatus may further include: an area-of-interest designation unit that designates an area that corresponds to half of a viewing angle, of the received image, as an area of interest; an area-of-interest determination unit that, in a case where the designated area of interest is viewed for a fixed time, determines the designated area of interest as the area of interest; and a viewpoint correction unit that determines whether or not objects that are the same in terms of a label value in an MPD of an object in the area of interest and in terms of a label value in an MPD at a viewpoint to which a user moves are present, and in a case where a result of the determination is that the same objects are present, corrects an image between the object in the area of interest and the object at the viewpoint to be moved, with the directional value in the MPD.

In the apparatus, the viewpoint correction unit may include an object determination module that determines whether or not the objects that are the same in terms of the label value in the MPD of the object in the area of interest and in terms of the label value in the MPD at the viewpoint to be moved are present; an offset directional-value derivation module that, in a case where the same objects are present, sets a difference between a directional value of a current object and a directional value of the object at the viewpoint to be moved, which are recorded in each MPD, as an offset direction; and a correction module that corrects and reproduces the object at the viewpoint to be moved in the derived offset direction.

In the apparatus, the offset directional-value derivation module may be provided in such a manner that, in a case where the same objects are not present, an offset directional value is derived for a difference x between a current viewpoint and the viewpoint to be moved, on the basis of a predetermined saturation function.

According to the present invention, an object at each viewpoint is recognized through image recognition, each recognized object is labeled, directional values and label values of objects that are determined as being the same are then input into an MPD, the MPD is transported, an object at a viewpoint to be moved, within an image, is corrected with a derived offset directional value, reproduction is performed, and thus, only with the labeling and the directional value of the object, the same content can be displayed on a screen without the user switching between directions. Accordingly, a reduction in an amount of data to be processed can improve a processing speed, and in turn, a sense of reality can be improved. In addition, compatibility with an existing DASH structure is ensured, and applicability to existing image transport systems is widely expandable.

BRIEF DESCRIPTION OF THE DRAWINGS

The accompanying drawings illustrate a preferred embodiment of the present invention and serve the purpose of helping get a better understanding of the technical idea of the present invention, along with DETAILED DESCRIPTION OF THE INVENTION. Therefore, the present invention should not be interpreted in a manner that is limited to matters that are illustrated in the drawings.

DETAILED DESCRIPTION OF THE INVENTION

Embodiments of the present invention will be described in more detail below with reference to the drawings.

Advantages and features of the present invention and methods of achieving the advantages and the features will be apparent from embodiments that will be described below with reference to the accompanying drawings.

However, the present invention is not limited to the embodiments that will be disclosed below, and various different embodiments thereof can be realized. The embodiments are only provided to make a complete disclosure of the present invention and to put a person of ordinary skill in the art to which the present invention pertains on full notice as to the scope of the invention. The scope of the present invention should be only defined in claims.

The terms that will be used throughout the present specification are briefly described, and the present invention is specifically described.

The terms that will be used throughout the present specification are selected from among general terms that are currently used as widely as possible, considering a function of the present invention. However, the terms may vary depending on the intention of a person of ordinary skill in the art, a judicial precedent, the appearance of a new technology, or the like. In addition, there is also a term that is arbitrarily coined by the applicant. The meaning thereof will be described in detail when the term is used. Therefore, the meaning of the term that is used throughout the present specification should be defined in light of the specification, not simply by the name of the term.

When the expression "includes a certain constituent element" is used throughout the specification, unless otherwise described, this expression means "further includes any other constituent element, not "excluding any other constituent element". In addition, the term "unit" that is used throughout the specification means a software constituent element or a hardware constituent element such as an FPGA or an ASIC and plays a certain role. However, the "unit" is not limited to meaning the software or hardware constituent elements. The "unit" may be configured to be present in a storage medium that is addressable and may be configured to operate one or more processors.

Therefore, the units include constituent elements, such as software constituent elements, object-oriented software constituent elements, class constituent elements, and task constituent elements, processes, functions, attributes, procedures, subroutines, segments of a program code, drivers, firmware, microcodes, circuits, pieces of data, a database, data structures, tables, arrays, variables, and the like. A number of constituent elements or units may be functionally combined into a smaller number of constituent elements or units and each constituent element or unit may be functionally split into more than two constituent elements or units.

The embodiments of the present invention will be described in detail below with reference to the accompanying drawings in such a manner that a person of ordinary skill in the art to which the present invention pertains is enabled to practice them without undue experimentation. For visual clarity, a portion that is unnecessary for a definite description of the present invention is omitted from the drawings.

According to an embodiment, a transport stream that is suitable for transport over a broadcasting network complies with a Real-time Object Delivery over Unidirectional Transport (ROTUE) or an MPEG Media Transport Protocol (MMTP). The ROUTE and the MMTP refer to a broadcast network transport stream multiplexing standard that is being standardized as ATSC 3.0 by the Advanced Systems Television Systems Committee (ATSC). In addition, a transport stream that is transported over the Internet complies with a Dynamic Adaptive Streaming over HTTP (MPEG-DASH) standard.

According to an embodiment, an object at each viewpoint is recognized, and the object is labeled with an identification number. Then, the respective directional values and identification numbers of objects that are determined as being the same are input into an MP, the MP is transported, and an offset directional value for correcting a direction of the object according to a change in a viewpoint is decided on the basis of the received MPD of the object. Then, when a user changes his/her viewpoint, the object is corrected with the decided offset directional value, and reproduction is performed. Accordingly, only with the object labeling and the directional value, the same content can be displayed on a screen without the user switching between directions.

Figure 1:
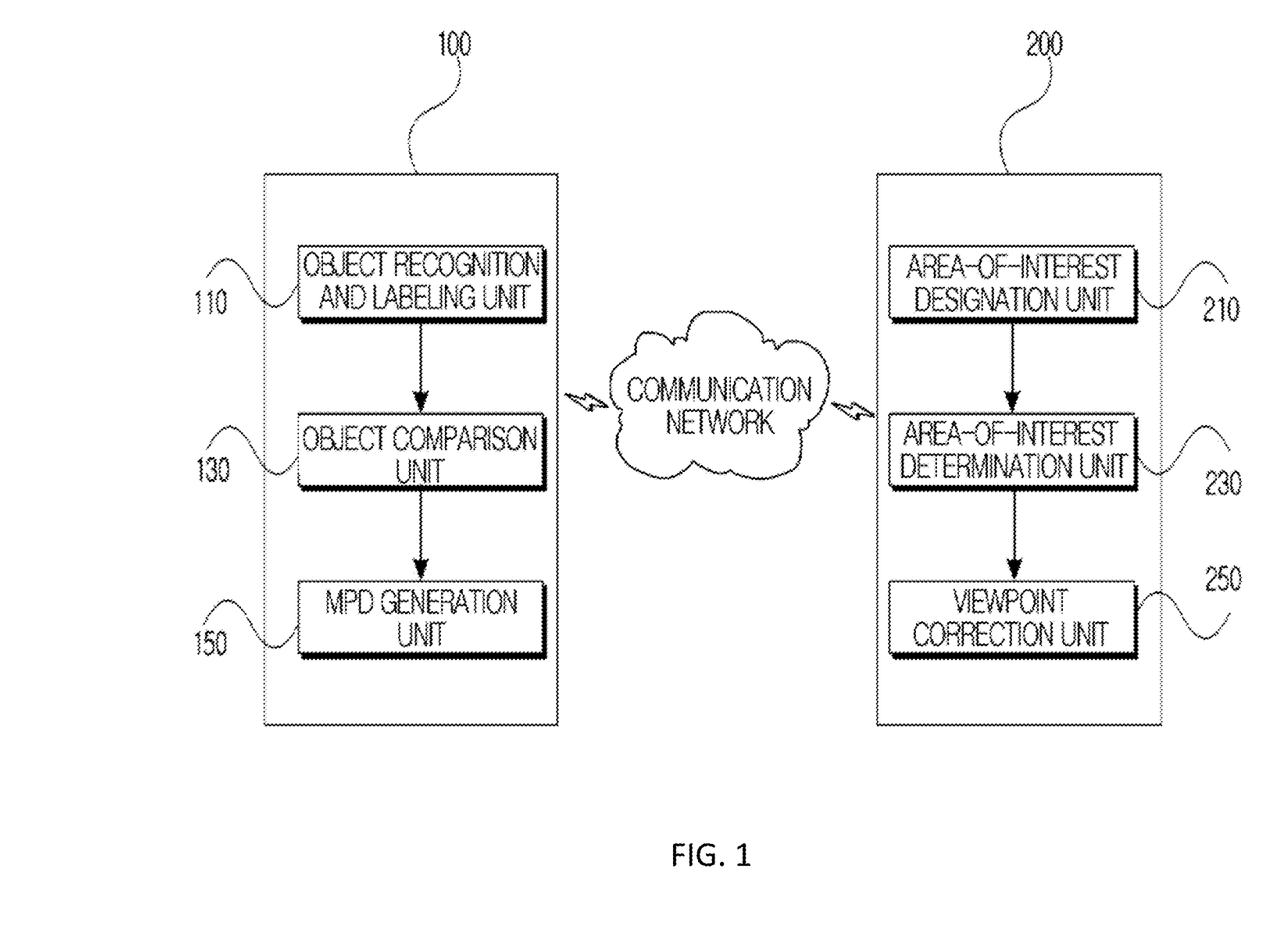
FIG. 1 is a diagram illustrating a configuration of a multi-image viewpoint correction apparatus according to an embodiment.
Figure 2:
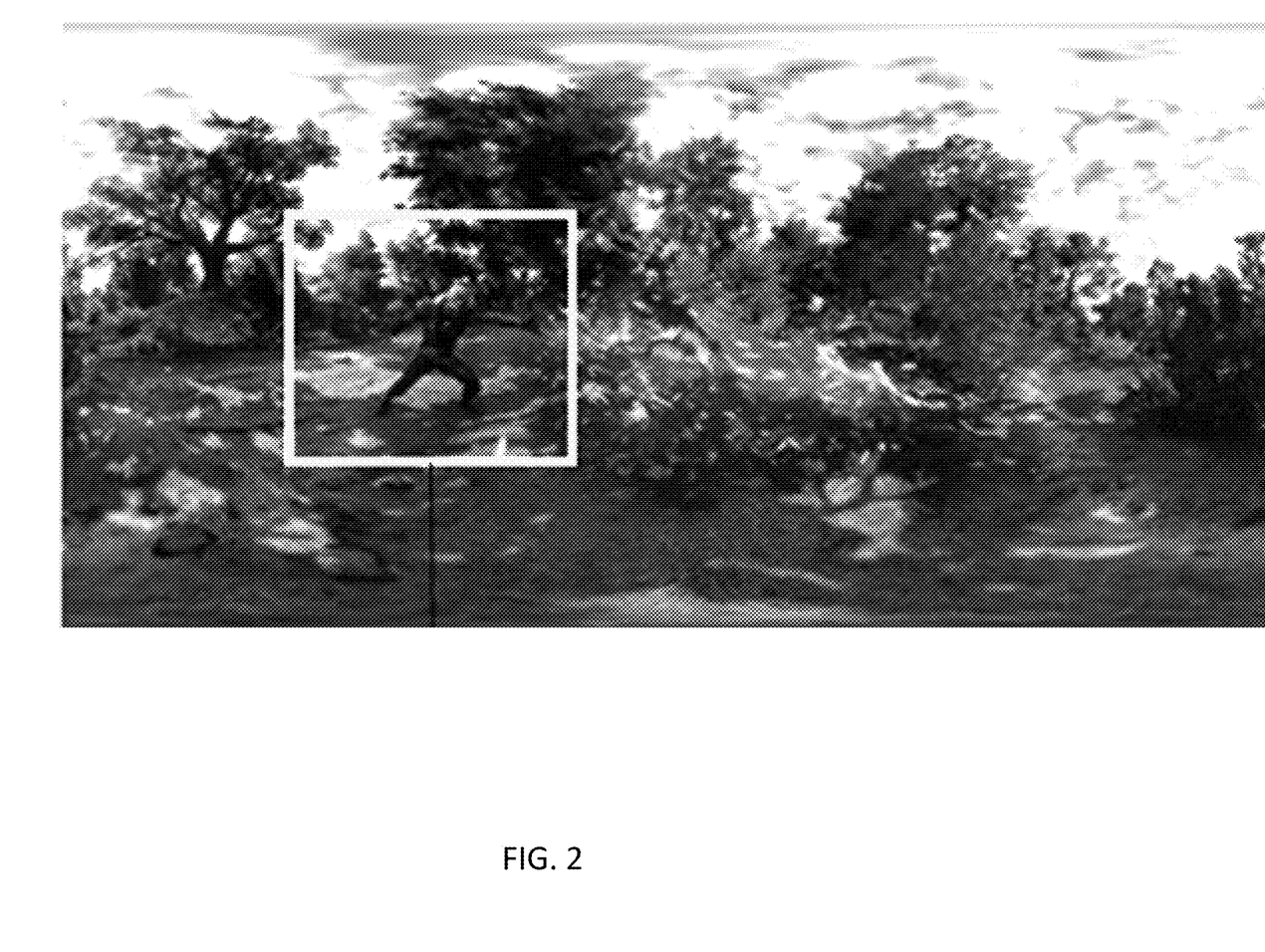
FIG. 2 is a conceptual diagram illustrating an object that is recognized by the apparatus according to the embodiment.
Figure 3:
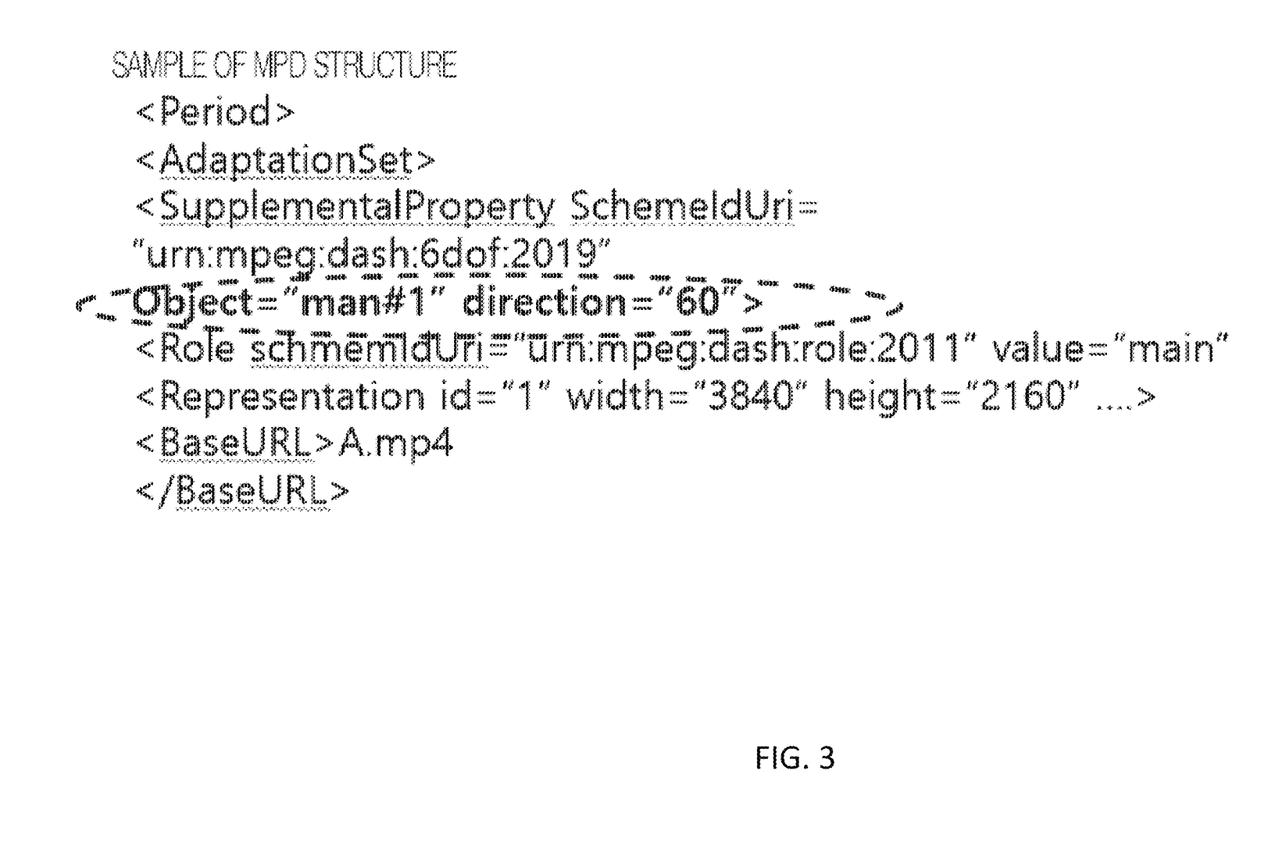
FIG. 3 is a diagram illustrating an MPD that is generated by the apparatus according to the embodiment.
Figure 4:
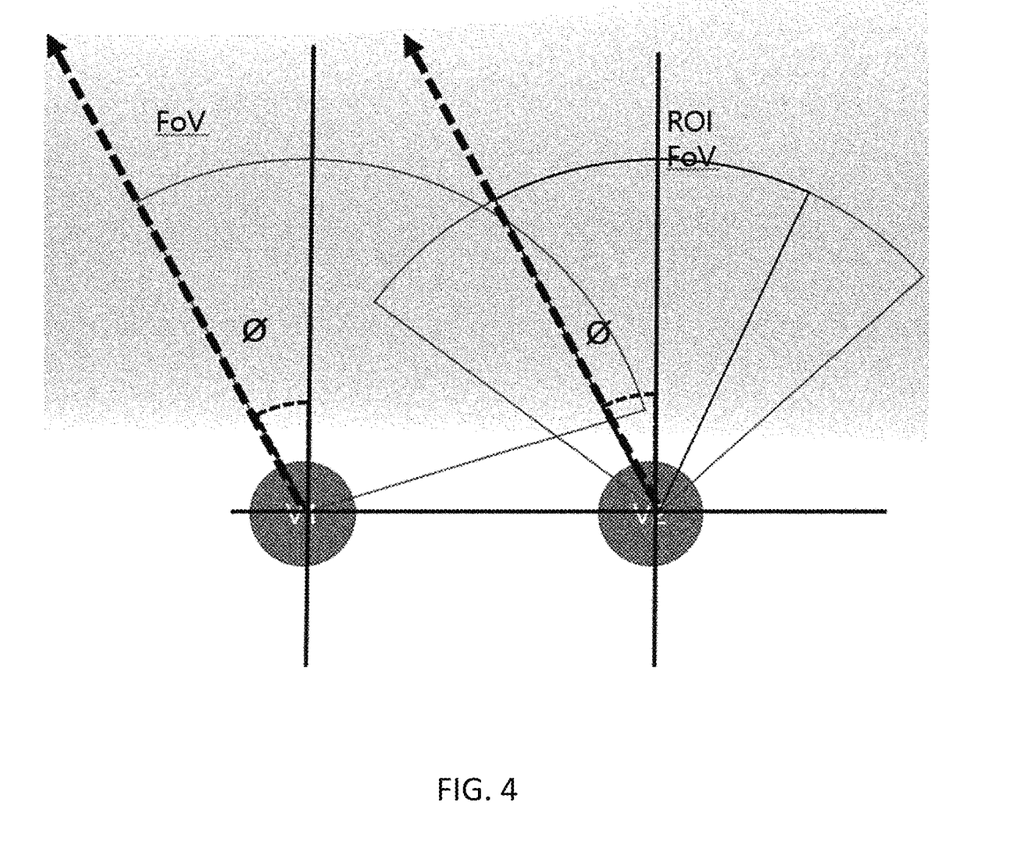
FIG. 4 is a conceptual diagram illustrating an area of interest that is designated by the apparatus according to the embodiment.

FIG. 1 is a diagram illustrating a configuration of a multi-image viewpoint correction apparatus in an image transport system according to an embodiment. FIG. 0.2 is a conceptual diagram for describing object recognition that is illustrated in FIG. 1. FIG. 3 is a diagram illustrating the MPD that is generated by an MPD generation unit in FIG. 1. FIG. 4 is a conceptual diagram for describing a process of designating and determining an area of interest RoI, which is illustrated in FIG. 3. With reference to FIGS. 1 to 4, a multi-image viewpoint correction apparatus according to an embodiment may include at least one of a transmission apparatus 100 that includes an object recognition and labeling unit 110, an object comparison unit 130, and an MPD generation unit 150, and a reproduction apparatus 200 that includes an area-of-interest designation unit 210, an area-of-interest determination unit 230, and a viewpoint correction unit 250.

Images that are acquired from many cameras are output as left-eye images and right-eye images that are captured by two cameras, respectively, which support a given resolution (for example, 8K resolution). An image that is captured by each camera is used as an ultra-high definition (UHD) image or an HD image as is, or an image in one portion of an area may be applied as a stereoscopic UHD image in 360-degree VR.

There are a large number of objects in images that are acquired through many cameras. These objects need to be distinguished into meaningful ones and meaningless ones. However, a large number of content items are recorded due to characteristics of a 360-degree image. Because of this, a large number of objects have to be image-captured due to a very wide angle of view in a non-specific image-capturing environment.

Accordingly, the object recognition and labeling unit 110 ignores objects below a reference size in order to extract an object in which the user is interested, from content that results from image capturing.

In addition, in a case where it is assumed that current image resolution increases exponentially and that in the future, resolution of the 360-degree image can increase up to as much as 12K such that pixels are not distinguishable, when a size ratio of an object to an entire image, not a pixel size, is at or above a fixed level, the object recognition and labeling unit 110 needs to recognize an object with such a size ratio as an object.

For example, a reference size for recognizing an object with such a size ratio as an object is decided as 2% of a size of the entire image. For example, 5% of the entire image means ⅒ or more of an image area that is currently viewed in accordance with a current angle of view for an HMD at which only approximately 20% of the entire image is viewable. A size of an object that is illustrated in FIG. 2 results from recognizing an object in an image of which a size is 15% or more.

The object recognition and labeling unit 110 recognizes the object described above and then performs labeling of the recognized object with an identification number.

Then, in a case where information on a positional relationship between images at viewpoints is recorded in the MPD, on the basis of the information on the positional relationship, the object comparison unit 130 can determine whether or not an object derived in the object recognition and labeling unit 110 and an object of which a position is changed within an image are the same.

In addition, in a case where the information on the positional relationship between the images at viewpoints is not recorded in the MPD, the object comparison unit 130 performs feature matching and size matching between the object derived in the object recognition and labeling unit 110 and the object of which the position is changed. Then, through similarity derived by performing Scale Structural Similarity (SSIM) computation, the object comparison unit 130 can determine whether or not the object derived in the object recognition and labeling unit 110 and the object of which the position is changed within the image are the same.

Then, the MPD generation unit 150 assigns the respective identification numbers and directional values of objects, which are determined as being the same, within the image, then records a labeling value and a directional value of the object at each viewpoint in an MPD, and as illustrated in FIG. 3, transfers the MPD to the reproduction apparatus 200. At this point, the directional value of the object is a position in the horizontal direction, which is positioned within the image, and is derived by substituting a value of an angle with respect to a user reference Yaw axis.

On other hand, the area-of-interest designation unit 210 of the reproduction apparatus 200 that receives the MPD designates an area of the image, which corresponds to half of a viewing angle FoV, as an area of interest. Then, in a case where the designated area of interest is viewed for a fixed time, the area-of-interest determination unit 230 determines the designated area of interest as an area of interest.

As illustrated in FIG. 4, a maximum viewpoint correction angle at the time of moving in the horizontal direction is decided as ½ of the viewing angle FoV for the area of interest RoI at a previous viewpoint V1. Then, a maximum viewpoint correction range where a viewing angle for an area of interest and an angle at a viewpoint V2 are angles at which two lines are parallel with each other is checked. It can be seen that the maximum point-in-time is ½ of the viewing angle for the area of interest with respect to the center axis.

Then, the viewpoint correction unit 250 is provided in such a manner that, with a label value in the MPD of the object in the area of interest and a label value in the MPD at a viewpoint to be moved, it is determined whether or not the same objects are present and in such a manner that, in a case where a result of the determination is that the same objects are present, an image between the object in the area of interest and the object at the viewpoint to be moved is corrected with the directional value in the MPD.

Figure 5:
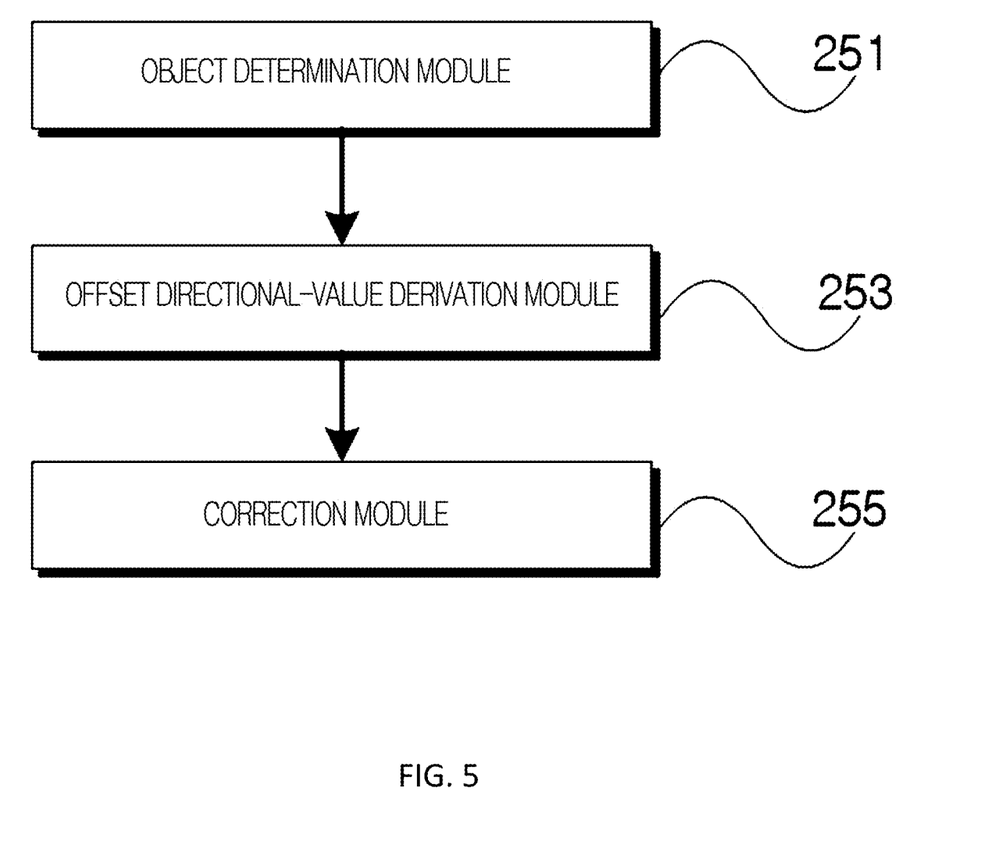
FIG. 5 is a diagram of a detailed configuration of a viewpoint correction unit according to an embodiment.

FIG. 5 is a diagram illustrating a detailed configuration of the viewpoint correction unit 250. With reference to FIG. 5, the viewpoint correction unit 250 may include an object determination module 251, an offset directional-value derivation module 253, and a correction module 255.

That is, the object determination module 251 derives a label value and a directional value for the identification number of the object within a current area of interest, which are stored in the received MPD, and checks whether or not the same identification numbers of the objects are present in the MPD at the viewpoint to be moved.

In a case where a result of the checking by the object determination module 251 is that the objects with the same identification numbers are present, the offset directional-value derivation module 253 sets a difference between a directional value of a current object and a directional value of the object at the viewpoint to be moved, which are recorded in each MPD, as an offset direction.

On the other hand, in a case where the same objects are not present in the MPD at the viewpoint to be moved, the offset directional-value derivation module 253 derives an optimal offset operational value that is arithmetically computed.

At this point, because a distance to a subject is difficult to know, viewpoint correction is performed only on a direction vertical to a viewing direction. For example, when it is assumed that a viewing angle in the horizontal direction is 120 degrees (that is, FoV=120°), the offset directional value for the horizontal direction is 25% of the viewing angle and has a maximum viewpoint correction angle range of ±30.

That is, the offset directional-value derivation module 253 decides an offset direction on the basis of a predetermined saturation function for a difference x between a current viewpoint and the viewpoint to be moved, and the saturation function in which saturation does not occur at high speed satisfies the following Equation 1.

$$\text{Offset Direction} = 60\left(\frac{1}{1+e^{-x}} - 1\right) \quad \text{Equation 1}$$

Then, with the derived offset operational value, the correction module 255 corrects a direction of the object at the viewpoint to be moved, within the image and thus performs reproduction.

Accordingly, the direction of the object at the viewpoint to be moved, within the image, is corrected with the derived offset directional value, and thus reproduction is performed. As a result, only with the identification number of and the directional value of the object, the same content can be displayed on a screen without the user switching between directions. Accordingly, a reduction in an amount of data to be processed can improve a processing speed, and in turn, user convenience and a sense of reality can be improved. In addition, compatibility with an existing DASH structure is ensured, and applicability to existing image transport systems is widely expandable.

The representative embodiments of the present invention are described in detail above, and it is apparent to a person of ordinary skill in the art to which the present invention pertains that various modifications to the embodiments described above are possibly made without departing from the scope of the present invention. Therefore, the claimed scope of the present invention should be defined not only by the following claims, but also by all alterations and modifications that derive from the concept of equivalents of the claims, without being limited to the embodiments described above.

What is claimed is:

1. A multi-view viewpoint correction apparatus in an image transport system, the apparatus comprising:
    an object recognition and labeling unit that extracts an object from images acquired through many cameras and labels the extracted object with an identification number;
    an object comparison unit that derives objects which have the same identification numbers according to a change in a viewpoint; and
    an MPD generation unit that inputs directional values and labeling values of the same objects in accordance with the change in the viewpoint into a media presentation description (MPD) of the object and transports the MPD,
    wherein the object recognition and labeling unit is provided in such a manner as to ignore an object below a reference size in an entire image in content that results from image-capturing and to label an object that has a ratio of the object to the entire image which is equal to or higher than a predetermined fixed ratio, with an identification number, and the reference size is set to 1/10 of an image area that is viewed, which is derived on the basis of a current viewing angle at which viewing is possible, of a head-mounted display (HMD).

2. The apparatus according to claim 1, wherein the object comparison unit is provided in such a manner that; in a case where information on a positional relationship between images at viewpoints is recorded in the MPD of the image, on the basis of the information on the positional relationship, it is determined whether or not an object derived in the object recognition and labeling unit and an object of which a position is changed are the same.

3. The apparatus according to claim 2, wherein the object comparison unit is provided in such a manner that, in a case where the information on the positional relationship between the images at viewpoints is not recorded in the MPD, feature matching and size matching are performed between the object derived in the object recognition and labeling unit and the object of which the position is changed and in such a manner that it is then determined through similarity derived on the basis of structural similarity (SSIM) whether or not the object derived in the object recognition and labeling unit and the object of which the position is changed within the image are the same.

4. The apparatus according to claim 3, wherein
    the MPD generation unit inputs a directional value and a label value for the identification number of the object derived in the object recognition and labeling unit, and a directional value and a label value for the identification number of the object of which the position is changed within the image, into a low-level portion of the MPD and transports the MPD, the two objects being determined by the object comparison unit as being the same.

5. The apparatus according to claim 4, wherein the directional value of the object is a position in the horizontal direction, which is positioned within the image, and is derived as a value of an angle with respect to a user reference Yaw axis.

6. The apparatus according to claim 5, wherein the multi-image viewpoint correction apparatus further comprises:
- an area-of-interest designation unit that designates an area that corresponds to half of a viewing angle, of the received image, as an area of interest;
- an area-of-interest determination unit that, in a case where the designated area of interest is viewed for a fixed time, determines the designated area of interest as the area of interest; and
- a viewpoint correction unit that determines whether or not objects that are the same in terms of a label value in an MPD of an object in the area of interest and in terms of a label value in an MPD at a viewpoint to be moved are present, and in a case where a result of the determination is that the same objects are present, corrects an image between the object in the area of interest and the object at the viewpoint to be moved, with the directional value in the MPD.

7. The apparatus according to claim 6, wherein the viewpoint correction unit comprises:
- an object determination module that determines whether or not the objects that are the same in terms of the label value in the MPD of the object in the area of interest and in terms of the label value in the MPD at the viewpoint to be moved are present;
- an offset directional-value derivation module that, in a case where the same objects are present, sets a difference between a directional value of a current object and a directional value of the object at the viewpoint to be moved, which are recorded in each MPD, as an offset direction; and
- a correction module that corrects and reproduces the object at the viewpoint to be moved in the derived offset direction.

8. The apparatus according to claim 7, wherein the offset directional-value derivation module is provided in such a manner that, in a case where the same objects are not present, an offset directional value is derived for a difference x between a current viewpoint and the viewpoint to be moved, on the basis of a predetermined saturation function.

* * * * *